(12) United States Patent
Sato (10) Patent No.: US 11,940,691 B2
(45) Date of Patent: Mar. 26, 2024

(54) LIQUID CRYSTAL DISPLAY DEVICE

(71) Applicant: TOPPAN INC., Tokyo (JP)

(72) Inventor: Ayumu Sato, Tokyo (JP)

(73) Assignee: TOPPAN INC., Tokyo (JP)

( * ) Notice: Subject to any disclaimer, the term of this patent is extended or adjusted under 35 U.S.C. 154(b) by 0 days.

(21) Appl. No.: 17/715,489

(22) Filed: Apr. 7, 2022

(65) Prior Publication Data

US 2022/0229332 A1 Jul. 21, 2022

Related U.S. Application Data

(63) Continuation of application No. PCT/JP2020/038780, filed on Oct. 14, 2020.

(30) Foreign Application Priority Data

Oct. 16, 2019 (JP) ................. 2019-189202

(51) Int. Cl.
*G02F 1/1335* (2006.01)
*G02F 1/1337* (2006.01)
(Continued)

(52) U.S. Cl.
CPC .. *G02F 1/133553* (2013.01); *G02F 1/133742* (2021.01); *G02F 1/134309* (2013.01); *G02F 1/136227* (2013.01); *G02F 2203/09* (2013.01)

(58) Field of Classification Search
CPC ......... G02F 1/133553; G02F 1/133742; G02F 1/134309
See application file for complete search history.

(56) References Cited

U.S. PATENT DOCUMENTS 7,242,448 B2 7/2007 Okumura
7,307,681 B2 12/2007 Okumura
(Continued)

FOREIGN PATENT DOCUMENTS

JP 2003-262852 A 9/2003
JP 2003-270627 A 9/2003
(Continued)

OTHER PUBLICATIONS

Machine translation of CN115692578A (Year: 2021).*
(Continued)

*Primary Examiner* — Lucy P Chien
(74) *Attorney, Agent, or Firm* — STAAS & HALSEY LLP (57) ABSTRACT

A liquid crystal display device includes: a liquid crystal layer interposed between first and second substrates and set in vertical alignment (VA); a switching element provided on the first substrate; a connection electrode connected to the switching element; a first reflection film provided above the switching element; a first pixel electrode provided above the first reflection film and overlapping the first reflection film; a second pixel electrode located adjacent to the first pixel electrode; first and second contacts which connect the first and second pixel electrodes to the connection electrode; a first thickness adjusting layer provided on the second substrate and overlapping the first reflection film; a common electrode provided on the second substrate and the first thickness adjusting layer; and first and second protrusions provided on the common electrode and corresponding to the first and second pixel electrodes.

9 Claims, 9 Drawing Sheets (51) Int. Cl.
*G02F 1/1343* (2006.01)
*G02F 1/1362* (2006.01)

(56) References Cited

U.S. PATENT DOCUMENTS

| | | | |
|---|---|---|---|
| 7,907,239 | B2 | 3/2011 | Okumura |
| 7,924,376 | B2 | 4/2011 | Okumura |
| 7,956,971 | B2 | 6/2011 | Nakamura et al. |
| 8,031,303 | B2 | 10/2011 | Higa |
| 2005/0036088 | A1 | 2/2005 | Okumura |
| 2005/0083479 | A1 | 4/2005 | Okumura |
| 2005/0117098 | A1 | 6/2005 | Kurasawa |
| 2006/0050209 | A1 | 3/2006 | Higa |
| 2006/0197894 | A1 | 9/2006 | Higa et al. |
| 2006/0274242 | A1 | 12/2006 | Okumura |
| 2007/0109453 | A1 | 5/2007 | Kaneko et al. |
| 2007/0199504 | A1 | 8/2007 | Nakamura et al. |
| 2007/0296895 | A1 | 12/2007 | Okumura |
| 2008/0151157 | A1 | 6/2008 | Okumura |
| 2008/0239227 | A1 | 10/2008 | Fan Jiang et al. |
| 2010/0044716 | A1 | 2/2010 | Lo et al. |
| 2010/0165274 | A1 | 6/2010 | Nakamura et al. |
| 2011/0304806 | A1 | 12/2011 | Higa |
| 2018/0046009 | A1 | 2/2018 | Arai et al. |

FOREIGN PATENT DOCUMENTS

| | | |
|---|---|---|
| JP | 3900123 | 4/2007 |
| JP | 3903980 B2 | 4/2007 |
| JP | 2008-116603 | 5/2008 |
| JP | 4123208 B2 | 7/2008 |
| JP | 4182748 B2 | 11/2008 |
| JP | 4432371 B2 | 3/2010 |
| TW | 200530720 A | 9/2005 |
| TW | 201643518 A | 12/2016 |
| WO | WO 2005/111708 A1 | 11/2005 |

OTHER PUBLICATIONS

Written Opinion (Form PCT/ISA/237); dated Dec. 28, 2020 in corresponding PCT Application No. PCT/JP2020/038780 (3 pages); (3 pages English Translation).
International Preliminary Report on Patentability (Form PCT/IB/373); dated Apr. 19, 2022 in corresponding PCT Application No. PCT/JP2020/038780; (1 page).
Notification of Transmittal of the International Preliminary Report on Patentability (Form PCT/IB/338); dated Apr. 19, 2022 in corresponding PCT Application No. PCT/JP2020/038780; (1 page).
Chinese Office Action issued in Chinese Application No. 202080072566.9 dated Jun. 5, 2023.
Notification of Examination Opinion dated Jul. 22, 2021 in corresponding Taiwanese Patent Application No. 11020706480 (8 pages) (5 pages English Translation).
International Search Report (Form PCT/ISA/210); dated Dec. 28, 2020 in corresponding PCT Application No. PCT/JP2020/038780 (3 pages) (2 pages English Translation).
Written Opinion (Form PCT/ISA/237); dated Dec. 28, 2020 in corresponding PCT Application No. PCT/JP2020/038780 (3 pages).
Extended European Search Report issued in counterpart European Application No. 20875719.5 dated Sep. 21, 2023.

* cited by examiner

LIQUID CRYSTAL DISPLAY DEVICE

CROSS-REFERENCE TO RELATED APPLICATIONS

This application is a Continuation Application of PCT Application No. PCT/JP2020/038780, filed Oct. 14, 2020, and based upon and claiming the benefit of priority from Japanese Patent Application No. 2019-189202, filed Oct. 16, 2019, the entire contents of all of which are incorporated herein by reference.

FIELD

The present invention relates to a liquid crystal display device capable of transmission display and reflection display.

BACKGROUND

A transflective liquid crystal display device capable of displaying images in both transmission mode and reflection mode has been known as a liquid crystal display device that is improved in outdoor visibility. In the transflective liquid crystal display device, a reflective metal film provided inside a liquid crystal cell is patterned to form a reflection area and a transmission area and combine reflection display by the reflection area and transmission display by the transmission area. In addition, a transparent step film or the like is provided in the reflection area to vary a cell gap (multigap) between the reflection area and the transmission area and thus optimize the optical characteristics (patent literature 1 (Jpn. Pat. Appln. KOKAI Publication No. 2003-262852) and patent literature 2 (Jpn. Pat. Appln. KOKAI Publication No. 2003-270627), for example).

In the liquid crystal display device having a multigap, steps are formed between the reflection area and the transmission area to easily cause an alignment failure at the boundary of the steps and a light leakage from the boundary. Thus, the following problems arise. The alignment failure makes an image rough and the light leakage reduces the contrast of display. In addition, when a user applies pressure to a display area with his or her finger or a pen (when the display area is pressed), the alignment failure is continued and the traces of the pressure will be left (patent literature 3 (International Publication No. 2005/111708)).

In order to solve the above problems, various methods are proposed, such as separating a pixel electrode (forming a slit) in a step portion between a reflection area and a transmission area in one pixel to form the reflection area and the transmission area independently (patent literature 4 (Japanese Patent No. 3900123)), controlling the height (patent literature 5 (Japanese Patent No. 4432371)) and inclination (patent literature 6 (Japanese Patent No. 3903980)) of a protrusion formed in the transmission area to control alignment, controlling alignment by an opening (hole) of the electrode in the reflection area of the electrode and a protrusion in the transmission area (patent literature 7 (Japanese Patent No. 4182748)), forming a recess in the reflection area and placing the protrusion in the recess (patent literature 8 (Japanese Patent No. 4123208)), and the like.

However, the following problems arise. When a pixel electrode is separated by a slit between a reflection area and a transmission area in one pixel and when the alignment of the reflection area is controlled by a protrusion, an opening (hole) of the electrode and the like, the reflection area needs to be sufficiently large (for example, the area of the reflection area is 30% or more larger than that of the pixel electrode) and the brightness of transmission display is lowered. Similarly, even when the alignment is controlled by the height and shape of a protrusion in the transmission area without increasing the area of the reflection area, the height and area of the protrusion are increased to lower the brightness of transmission display.

SUMMARY

According to an aspect of the present invention, there is provided a liquid crystal display device comprising:

first and second substrates;

a liquid crystal layer interposed between the first and second substrates and set in vertical alignment (VA) when no electric field is applied;

a switching element provided on the first substrate;

a connection electrode provided on the first substrate, connected to the switching element, and extending in a first direction;

a first reflection film provided above the switching element with an insulating film therebetween;

a first pixel electrode provided above the first reflection film with an insulating film therebetween and overlapping the first reflection film in planar view;

a second pixel electrode located adjacent to the first pixel electrode in the first direction;

first and second contacts which connect the first and second pixel electrodes to the connection electrode;

a first thickness adjusting layer provided on the second substrate and overlapping the first reflection film in planar view;

a common electrode provided on the second substrate and the first thickness adjusting layer; and first and second protrusions provided on the common electrode and corresponding to the first and second pixel electrodes, respectively, wherein the first protrusion is located to shift toward the first thickness adjusting layer from a center of the first pixel electrode in the first direction.

DETAILED DESCRIPTION

Embodiments will be described below with reference to the drawings. The drawings are schematic or conceptual, and the dimension, ratio, or the like in each of the drawings is not necessarily the same as the actual one. The drawings may include portions that differ in the relationship in dimensions and in the ratio even though the portions are the same. Some of the embodiments exemplify a device and a method for embodying the technical concept of the present invention, and the technical concept is not specified by the shape, configuration, placement, etc. of the components. In the following descriptions, the elements having the same function and configuration are denoted by the same sign and their descriptions will be repeated only when necessary.

[1] FIRST EMBODIMENT

[1-1] Overall Configuration of Liquid Crystal Display Device

Figure 1:
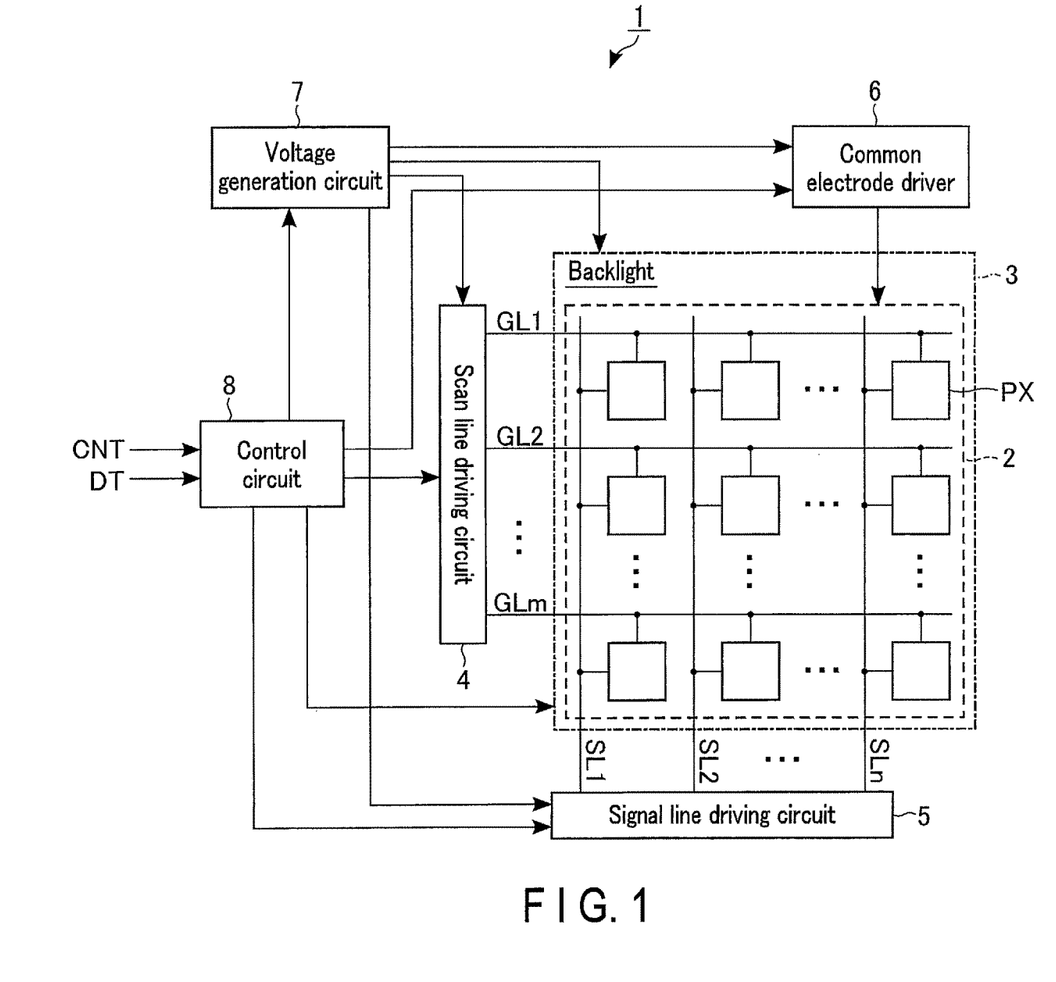
FIG. 1 is a block diagram of a liquid crystal display device according to a first embodiment.

FIG. 1 is a block diagram of a liquid crystal display device 1 according to a first embodiment of the present invention. The liquid crystal display device 1 includes a liquid crystal display panel 2, a backlight (illumination device) 3, a scan line driving circuit 4, a signal line driving circuit 5, a common electrode driver 6, a voltage generation circuit 7 and a control circuit 8.

The liquid crystal display panel 2 includes a pixel array in which a plurality of pixels PX are arranged in a matrix. The liquid crystal display panel 2 includes a plurality of scan lines GL1 to GLm each extending in the row direction and a plurality of signal lines SL1 to SLn each extending in the column direction. The letters "m" and "n" each indicate an integer of two or more. Pixels PX are placed in intersection areas between the scan and signal lines GL and SL.

The backlight 3 is a surface light source that irradiates the back surface of the liquid crystal display panel 2 with light. As the backlight 3, for example, a direct type or a side light (edge light) type LED backlight is used.

The scan line driving circuit 4 is electrically connected to the scan lines GL. Upon receiving a control signal from the control circuit 8, the scan line driving circuit 4 sends scan signals to the liquid crystal display panel 2 to turn on/off the switching elements included in the pixels PX.

The signal line driving circuit 5 is electrically connected to the signal lines SL. The signal line driving circuit 5 receives a control signal and display data from the control circuit 8. In response to the control signal, the signal line driving circuit 5 sends gradation signals (drive voltages) corresponding to the display data to the liquid crystal display panel 2.

The common electrode driver 6 generates a common voltage Vcom and applies it to the common electrode in the liquid crystal display panel 2. The voltage generation circuit 7 generates various voltages necessary for the operation of the liquid crystal display device 1 and applies them to the respective circuits.

The control circuit 8 collectively controls the operation of the liquid crystal display device 1. The control circuit 8 externally receives image data DT and control signal CNT. Based on the image data DT, the control circuit 8 generates various control signals and sends the control signals to each of the circuits.

[1-2] Configuration of Liquid Crystal Display Panel 2

The liquid crystal display panel 2 according to the present embodiment is a transflective liquid crystal display panel capable of transmission display and reflection display.

Figure 2:
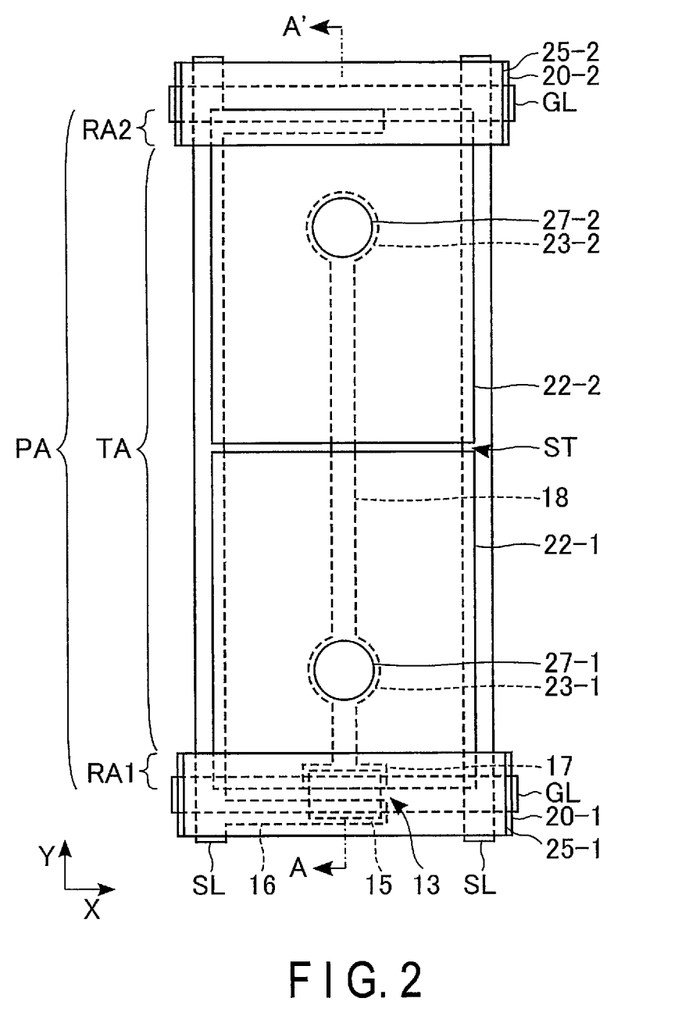
FIG. 2 is a plan view of a liquid crystal display panel according to the first embodiment.
Figure 3:
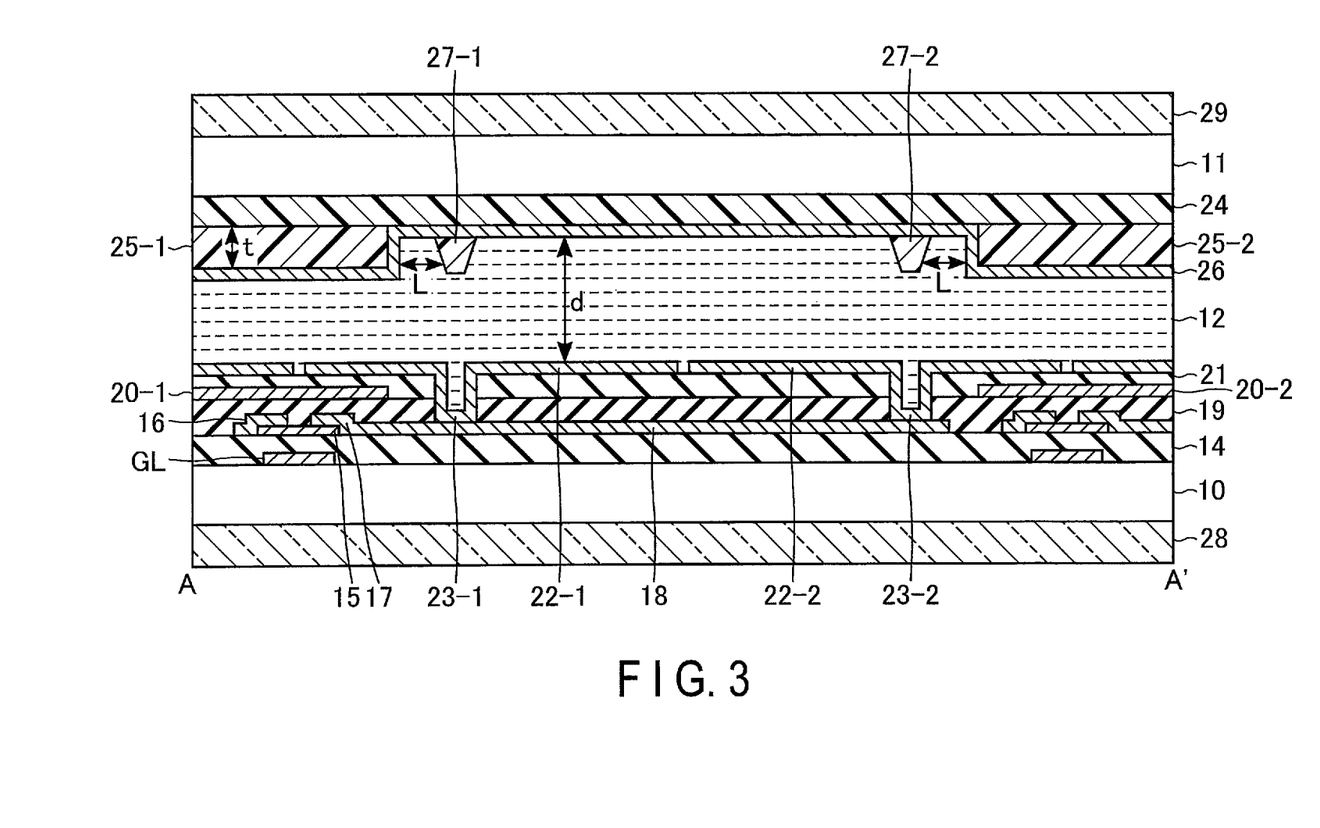
FIG. 3 is a sectional view of the liquid crystal display panel taken along line A-A' of FIG. 2.

FIG. 2 is a plan view of the liquid crystal display panel 2 according to the first embodiment. FIG. 3 is a sectional view of the liquid crystal display panel 2 taken along line A-A' in FIG. 2. In FIG. 2, a portion corresponding to one pixel is extracted and actually, a plurality of pixels each corresponding to the pixel shown in FIG. 2 are arranged in a matrix.

The liquid crystal display panel 2 includes a TFT substrate 10 on which a switching element (TFT), a pixel electrode and the like are formed, and a color filter substrate (CF substrate) 11 on which a color filter, a common electrode and the like are formed and which is opposed to the TFT substrate 10. Each of the TFT and CF substrates 10 and 11 is configured by a transparent substrate (for example, a glass substrate or a plastic substrate).

The liquid crystal layer 12 is filled between the TFT and CF substrates 10 and 11. Specifically, the liquid crystal layer 12 is sealed in a display area surrounded by the TFT and CF substrates 10 and 11 and a sealing member (not shown). The sealing member is made of an ultraviolet-curing resin, a thermosetting resin, an ultraviolet-heat combination-type curing resin, or the like, and is applied to the TFT substrate 10 or the CF substrate 11 in the manufacturing process and then cured by ultraviolet irradiation, heating, or the like.

The liquid crystal materials of the liquid crystal layer 12 vary in optical characteristics as the alignment of liquid crystal molecules is manipulated in accordance with an electric field applied between the TFT and CF substrates 10 and 11. The liquid crystal display panel 2 of the present embodiment is set in a vertical alignment (VA) mode using a VA type liquid crystal. That is, a negative (N-type) nematic liquid crystal having negative dielectric anisotropy is used as the liquid crystal layer 12. The liquid crystal layer 12 is vertically aligned in an initial state. When no voltage (no electric field) is applied to the liquid crystal layer 12, the major axes (directors) of liquid crystal molecules is aligned substantially vertically with respect to the main surface of the substrate. When a voltage is applied to the liquid crystal layer 12, the major axes of the liquid crystal molecules tilt toward the horizontal direction with respect to the main surface of the substrate.

First is a description of the configuration alongside the TFT substrate 10. A switching element 13 is provided for each pixel on the liquid crystal layer 12 side of the TFT substrate 10. As the switching element 13, for example, a thin film transistor (TFT) and an n-channel TFT are used. As will be described later, the TFT 13 includes a gate electrode functioning as a scan line, a gate insulating film provided on the gate electrode, a semiconductor layer provided on the gate insulating film, and a source electrode and a drain electrode which are provided on the semiconductor layer so as to be spaced from each other.

A gate electrode GL is provided on the TFT substrate 10 to extend in the X direction. The gate electrode GL functions as a scan line GL. A plurality of pixels of one row arranged in the X direction are connected in common to one scan line GL. A gate insulating film 14 is provided on the TFT substrate 10 and the gate electrode GL.

On the gate insulating film 14, a semiconductor layer 15 is provided for each pixel. For example, amorphous silicon is used as the semiconductor layer 15.

On the semiconductor layer 15 and the gate insulating film 14, a source electrode 16 and a drain electrode 17 are provided so as to be spaced from each other in a Y direction (which is orthogonal to the X direction). The source electrode 16 and drain electrode 17 each overlap the semiconductor layer 15. In order to improve electrical connection between the source electrode 16 and the semiconductor layer 15, an $n^+$-type semiconductor layer into which high-concentration n-type impurities are doped may be provided between them. Similarly, an n+-type semiconductor layer may be provided between the drain electrode 17 and the semiconductor layer 15.

A connection electrode 18 is provided on the gate insulating film 14 to extend in the Y direction. The connection electrode 18 is electrically connected to the drain electrode 17.

Signal lines SL are provided on the gate insulating film 14 to extend in the Y direction. The signal lines SL are each placed at a boundary between adjacent two pixels in the X direction. A plurality of pixels for one row arranged in the Y direction are connected in common to one signal line SL. The signal line SL is electrically connected to the source electrode 16.

An insulating film 19 is provided on the source electrode 16, drain electrode 17, connection electrode 18, signal lines SL and gate insulating film 14.

Reflecting films 20-1 and 20-2 are provided on the insulating film 19. The reflecting film 20-1 extends in the X direction to cover the TFT 13. The reflecting film 20-2 extends in the X direction to cover a TFT of a pixel adjacent to the pixel in the Y direction. The reflecting films 20-1 and 20-2 have a function of reflecting external light that is incident from the display surface side.

An insulating film 21 is provided on the insulating film 19 and the reflecting films 20-1 and 20-2.

Pixel electrodes 22-1 and 22-2 are provided on the insulating film 21. The pixel electrodes 22-1 and 22-2 are separated by a slit ST and arranged side by side in the Y direction. In planar view, the pixel electrode 22-1 overlaps the reflecting film 20-1. In planar view, the pixel electrode 22-2 overlaps the reflecting film 20-2. The planar view is viewing a pixel from above (from the substrate 11 side).

The pixel electrode 22-1 is electrically connected to the connection electrode 18 by a contact 23-1. The pixel electrode 22-2 is electrically connected to the connection electrode 18 by a contact 23-2.

A pixel area PA is defined by the pixel electrodes 22-1 and 22-2 and corresponds to an area of the combination of the pixel electrodes 22-1 and 22-2. An area where the pixel electrode 22-1 and the reflecting film 20-1 overlap, is a reflection area RA1. An area where the pixel electrode 22-2 and the reflecting film 20-2 overlap, is a reflection area RA2. In the pixel area PA, an area of the combination of the reflection area RA1 and RA2, is a reflection area of the entire pixel. In the pixel area PA, an area where neither of the reflecting films 20-1 and 20-2 is provided, is a transmission area TA. The cell gap of the transmission area TA is defined as "d." The cell gap is the thickness of the liquid crystal layer and is defined by the distance between the pixel electrode and the common electrode.

Although not shown, an alignment film is provided on the pixel electrodes 22-1 and 22-2 and the insulating film 21 to control the alignment of the liquid crystal layer 12. The alignment film vertically aligns the liquid crystal molecules in the initial state of the liquid crystal layer 12.

Next is a description of the configuration alongside the CF substrate 11. A color filter 24 is provided on the liquid crystal layer 12 side of the CF substrate 11. The color filter 24 is any one of a red filter, a green filter and a blue filter.

Thickness adjusting layers 25-1 and 25-2 are provided on the color filter 24. The thickness adjusting layer 25-1 has approximately the same size (area) as the reflecting film 20-1, and is placed so as to overlap the reflecting film 20-1 in planar view. The thickness adjusting layer 25-2 has approximately the same size (area) as the reflecting film 20-2, and is placed so as to overlap the reflecting film 20-2 in planar view. The height (thickness) of each of the thickness adjusting layers 25-1 and 25-2 is defined as "t."

A common electrode 26 is provided on the color filter 24 and the thickness adjusting layers 25-1 and 25-2. The common electrode 26 is provided in common to a plurality of pixels.

Protrusions 27-1 and 27-2 are provided on the common electrode 26. The protrusion 27-1 is disposed so as to overlap the contact 23-1 in planar view. The protrusion 27-2 is disposed so as to overlap the contact 23-2 in planar view. The projections 27-1 and 27-2 have a function of controlling the alignment of the liquid crystal layer 12. The protrusions 27-1 and 27-2 are provided to correspond to the pixel electrodes 22-1 and 22-2, respectively.

The protrusion 27-1 is disposed closer to the center of the pixel than the thickness adjusting layer 25-1. The protrusion 27-2 is disposed closer to the center of the pixel than the thickness adjusting layer 25-2. The distance between the protrusion 27-1 and the thickness adjusting layer 25-1 and the distance between the protrusion 27-2 and the thickness adjusting layer 25-2 are defined as "L."

In the present embodiment, a multi-domain (alignment division) system, namely, a multi-domain vertical alignment (MVA) mode is applied to the liquid crystal display panel 2. In the MVA mode, one pixel is divided into a plurality of areas (domains), and the direction in which liquid crystal molecules are inclined in each of the areas is changed. The protrusions 27-1 and 27-2 control the direction in which liquid crystal molecules are inclined. That is, the liquid crystal molecules are inclined radially about each of the protrusions 27-1 and 27-2. The use of the MVA mode makes it possible to decrease the viewing angle dependence greatly and increase the viewing angle.

Instead of the protrusions 27-1 and 27-2, openings formed in the common electrode 26 may be used. In this case, the openings have substantially the same size as the protrusions 27-1 and 27-2.

Although not shown, an alignment film is provided on the common electrode 26 and the protrusions 27-1 and 27-2 to control the alignment of the liquid crystal layer 12. The alignment film vertically aligns the liquid crystal molecules in the initial state of the liquid crystal layer 12.

A polarizing plate 28 is stacked on the TFT substrate 10 opposite to the liquid crystal layer 12, and a polarizing plate 29 is stacked on the CF substrate 11 opposite to the liquid crystal layer 12. The polarizing plates 28 and 29 are placed such that their transmission axes are orthogonal to each other, that is, in a crossed nicols state. A ¼ wavelength plate may be provided between the TFT substrate 10 and the polarizing plate 28. A ¼ wavelength plate may be provided between the CF substrate 11 and the polarizing plate 29.

Examples of Materials

As the gate electrode GL, source electrode 16, drain electrode 17 and signal lines SL, for example, any one of aluminum (Al), molybdenum (Mo), chromium (Cr) and tungsten (W), or an alloy containing one or more of these is used. The connection electrode 18, pixel electrodes 22-1 and 22-2, contacts 23-1 and 23-2, and the common electrode 26 are formed of a transparent electrode, and, for example, indium tin oxide (ITO) is used. As the reflecting films 20-1 and 20-2, for example, aluminum (Al) is used. The gate insulating film 14 and the insulating films 19 and 21 are formed of a transparent insulating material, such as silicon nitride (SiN). The thickness adjusting layers 25-1 and 25-2 are made of a transparent resin. The protrusions 27-1 and 27-2 are made of a transparent resin.

[1-3] Conditions of Liquid Crystal Display Panel 2

Figure 4:
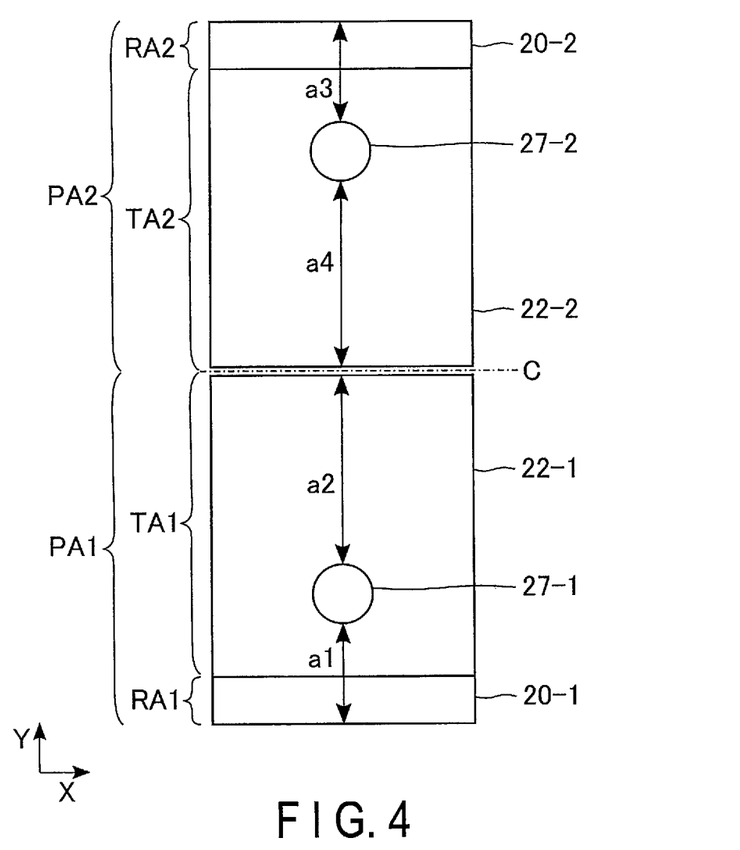
FIG. 4 is a schematic diagram illustrating the conditions of the liquid crystal display panel.

Next is a description of the conditions of the liquid crystal display panel 2. FIG. 4 is a schematic diagram illustrating the conditions of the liquid crystal display panel 2.

In FIG. 4, in the pixel, an area in which the pixel electrode 22-1 is provided is a partial pixel area PA1 and an area in which the pixel electrode 22-2 is provided is a partial pixel area PA2. The area corresponding to the combination of the partial pixel areas PA1 and PA2 is a pixel area PA. The boundary between the partial pixel areas PA1 and PA2 corresponds to the center line C of the pixel.

In the partial pixel area PA1, an area in which the reflecting film 20-1 (and the thickness adjusting layer 25-1) is provided is a reflecting area RA1 and an area in which the reflecting film 20-1 is not provided is a transmitting area TA1. In the partial pixel area PA2, an area in which the reflecting film 20-2 (and the thickness adjusting layer 25-2) is provided is a reflecting area RA2 and an area in which the reflecting film 20-2 is not provided is a transmitting area TA2. An area corresponding to the combination of the reflecting areas RA1 and RA2 is a reflecting area RA of the entire pixel. An area corresponding to the combination of the transmitting areas TA1 and TA2 is a transmitting area TA of the entire pixel.

In planar view, the protrusion 27-1 is displaced from the center of the partial pixel area PA1 in the Y direction toward the reflecting area RA1. In planar view, the protrusion 27-2 is displaced from the center of the partial pixel area PA2 in the Y direction toward the reflecting area RA2.

The following are specific definitions. The distance between the protrusion 27-1 and the end of the partial pixel area PA1 closer to the reflecting area RA1 is defined as a1. The distance between the protrusion 27-1 and the other end of the partial pixel area PA1 (the end closer to the center line of the pixel) is defined as a2. The distances a1 and a2 have the relation of "a1<a2."

The distance between the protrusion 27-2 and the end of the partial pixel area PA2 closer to the reflecting area RA2 is defined as a3. The distance between the protrusion 27-2 and the other end of the partial pixel area PA2 (the end closer to the center line of the pixel) is defined as a4. The distances a3 and a4 have the relation of "a3<a4." Preferably, the distances a3 and a4 have the relation of "a1≈a3" and "a2≈a4" in order to equalize the upper and lower viewing angle dependence in the Y direction.

Figure 5:
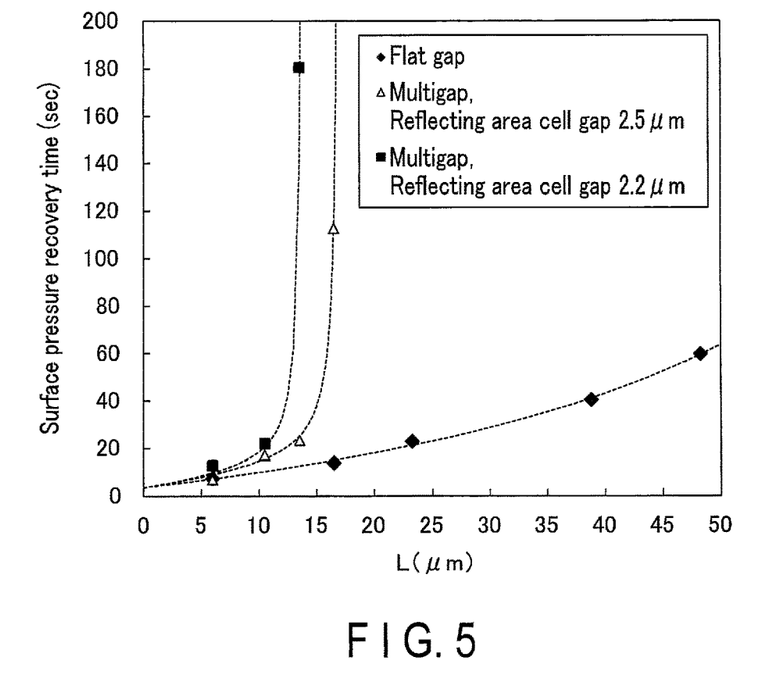
FIG. 5 is a graph showing the relationship between a distance between a thickness adjusting layer and a protrusion and surface pressure recovery time.

FIG. 5 is a graph showing the relationship between distance L between a thickness adjusting layer and a protrusion and surface pressure recovery time. The surface pressure means a case where a user applies pressure onto the display surface of the liquid crystal display panel 2 with his or her finger or a pen, and the surface pressure recovery time means time until a display failure, which is caused by the misalignment of a liquid crystal layer due to the surface pressure, is recovered. In FIG. 5, the horizontal axis represents the distance L (μm) between the thickness adjusting layer and the protrusion and the vertical axis represents the surface pressure recovery time (sec). The cell gap d of the transmitting area is 3.8 the surface pressure is 0.5 MPa, and the surface pressure hold time is 5 sec. The graph of FIG. 5 shows (1) a flat gap, (2) a multigap and a reflecting area cell gap of 2.5 μm, and (3) a multigap and a reflecting area cell gap of 2.2 μm. The flat gap means that there is no thickness adjusting layer and thus the gap of the liquid crystal layer is uniform.

Figure 6:
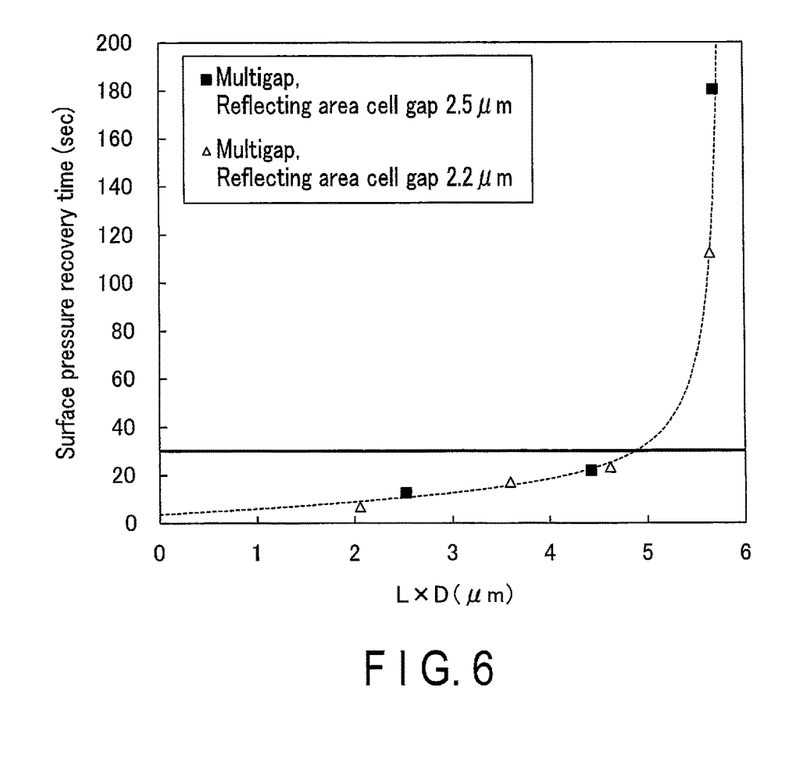
FIG. 6 is a modification to the graph of multigap shown in FIG. 5.

FIG. 6 is a modification to the graph of multigap shown in FIG. 5. In FIG. 6, the horizontal axis represents parameter L×D (μm) and the vertical axis represents surface pressure recovery time (sec). The ratio of height t of the thickness adjusting layer to cell gap d of the transmitting area is defined as D. That is, "D=t/d." The parameter L×D is the product of the distance L between the thickness adjusting layer and the protrusion and the ratio D. By modifying the graph of FIG. 5 using the parameters L×D, the surface pressure recovery time can be defined uniquely in a plurality of multigaps. The curve in FIG. 6 is obtained by fitting using a function of "ax/(b−x)."

In the present embodiment, the liquid crystal display panel 2 is capable of recovering a display failure due to surface pressure within 30 seconds. In this case, the distance L between the thickness adjusting layer and the protrusion, the cell gap d of the transmitting area, and the height t of the thickness adjusting layer are set so as to satisfy the condition of "L×D≤4.9 μm."

In the present embodiment, the area of the transmitting area is set larger than that of the reflecting area. For example, the area of the reflecting area is 30% or less of that of the partial pixel area. In other words, the area of the reflecting film 20-1 (or the thickness adjusting layer 25-1) is 30% or less of the area of the pixel electrode 22-1. Referring to FIG. 2, the area of the reflecting film 20-1 is the area of the portion of the reflecting film 20-1 that overlaps the pixel electrode 22-1. Similarly, the area of the reflecting film 20-2 (or the thickness adjusting layer 25-2) is 30% or less of the area of the pixel electrode 22-2. Referring to FIG. 2, the area of the reflecting film 20-2 is the area of the portion of the reflecting film 20-2 that overlaps the pixel electrode 22-2.

[1-4] Modification

Figure 7:
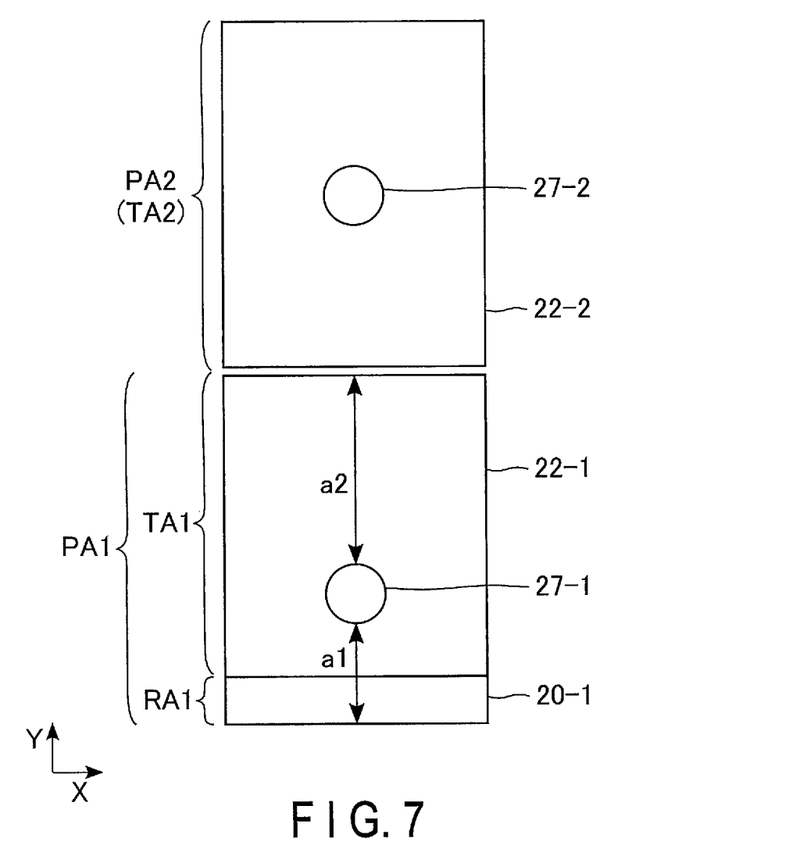
FIG. 7 is a schematic diagram of a liquid crystal display panel according to a modification.

Next is a description of a modification. FIG. 7 is a schematic diagram of a liquid crystal display panel 2 according to the modification.

The configuration of a partial pixel area PA1 is the same as that in the above-described embodiment. That is, the partial pixel area PA1 includes a reflecting area RA1 and a transmitting area TA1. The partial pixel area PA1 is provided with a pixel electrode 22-1, and the reflecting area RA1 is provided with a reflecting film 20-1.

The partial pixel area PA2 is configured by the transmitting area TA1 in its entity. The partial pixel area PA2 is provided with a pixel electrode 22-2. The partial pixel area PA2 is provided with no reflecting area. A protrusion 27-2 is formed in the center of the partial pixel area PA2.

The conditions of distances a1 and a2 in the partial pixel area PA1 are the same as those in the embodiment.

The present embodiment can also be applied to the liquid crystal display panel 2 according to the modification in which a pixel includes one reflecting area.

[1-5] Advantageous Effects of First Embodiment

In the first embodiment, one pixel is divided into two partial pixel areas PA1 and PA2. The partial pixel area PA1 includes a reflecting area RA1 provided with a reflecting film 20-1 and a thickness adjusting layer 25-1, and a transmitting area TA1 other than the reflecting area RA1. The partial pixel area PA2 includes a reflecting area RA2 provided with a reflecting film 20-2 and a thickness adjusting layer 25-2, and a transmitting area TA2 other than the reflecting area RA2. The boundary between the reflecting area RA1 and the transmitting area TA1 is stepped by the thickness adjusting layer 25-1. The boundary between the reflecting area RA2 and the transmitting area TA2 is stepped by the thickness adjusting layer 25-2. The protrusion 27-1 for alignment control is located to shift from the center of the partial pixel area PA1 (pixel electrode 22-1) in the Y direction toward the thickness adjusting layer 25-1. Similarly, the protrusion 27-2 is located to shift from the center of the partial pixel area PA2 (pixel electrode 22-2) in the Y direction toward the thickness adjusting layer 25-2.

Therefore, the first embodiment makes it possible to inhibit display quality from being lowered by alignment failure and to inhibit traces, which are caused by the alignment failure at the time of surface pressure, from being left, without decreasing brightness in transmission display.

When the area of the reflection area is small, the above advantageous effects can be obtained more effectively if the area of the reflection area is, for example, 30% or less of the area of the partial pixel area.

[2] SECOND EMBODIMENT

Figure 8:
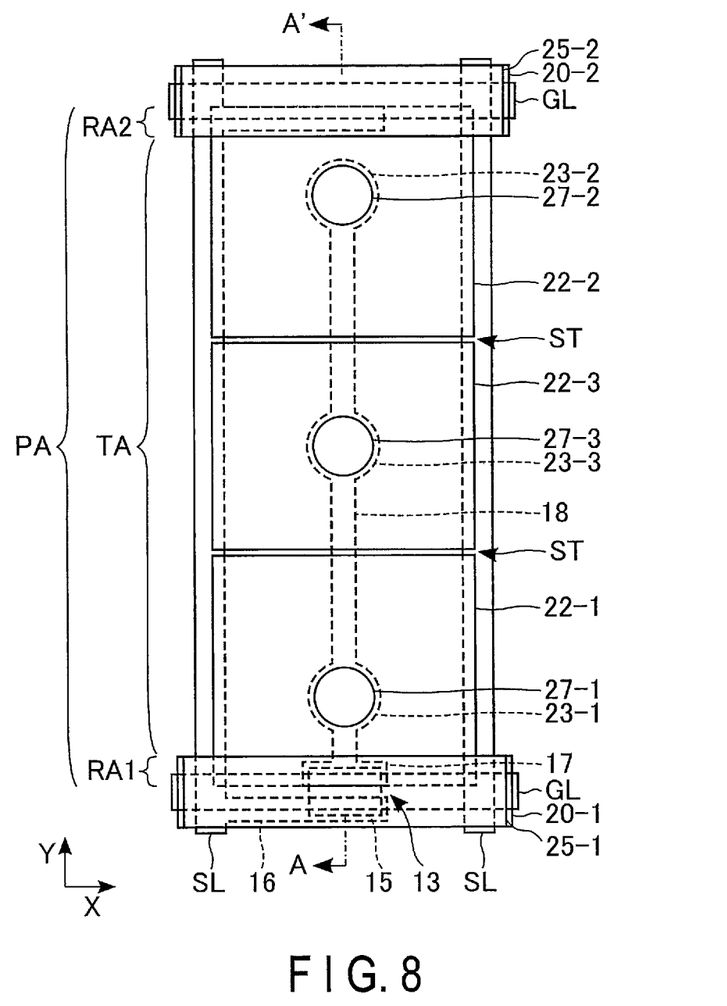
FIG. 8 is a plan view of a liquid crystal display panel according to a second embodiment.
Figure 9:
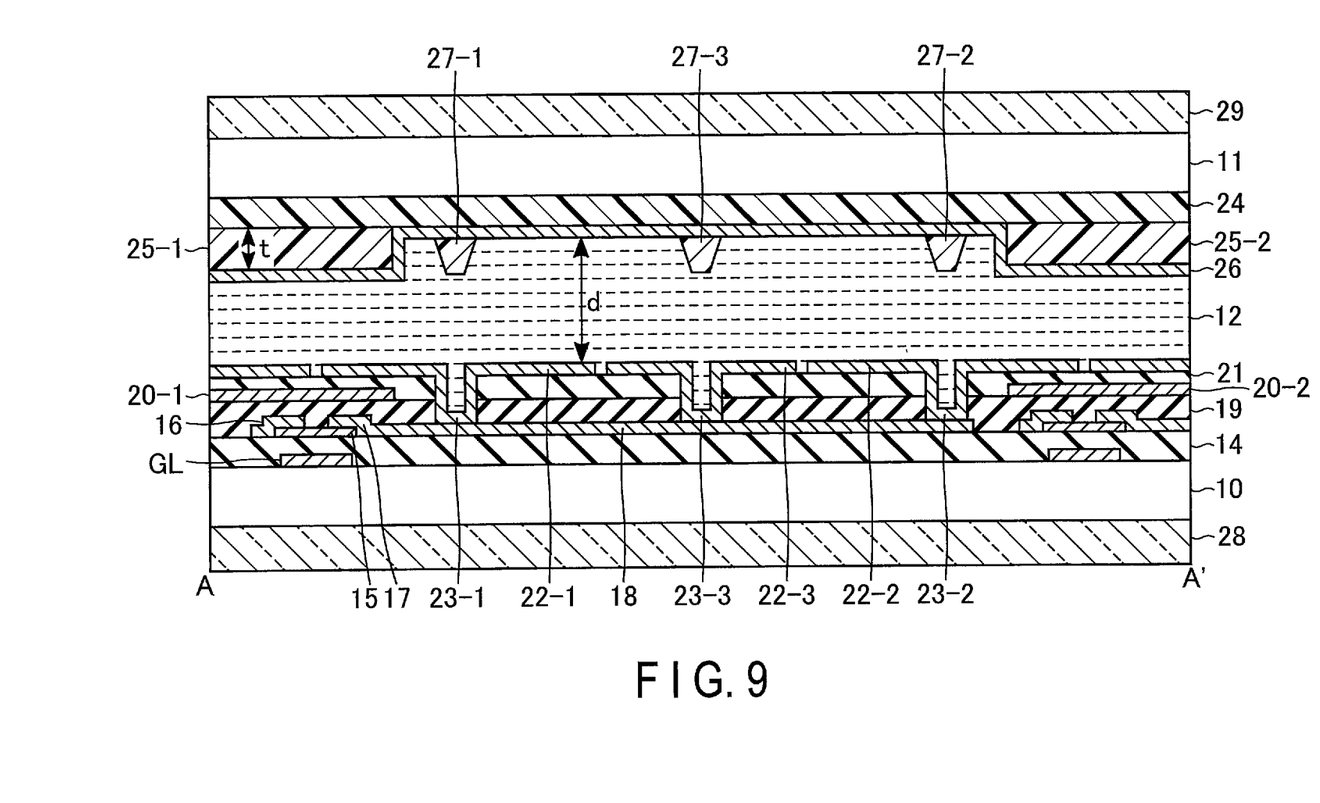
FIG. 9 is a sectional view of the liquid crystal display panel taken along line A-A' of FIG. 8.

The second embodiment is directed to an example of a configuration example of a three-division pixel in which one pixel is divided into three partial pixels. FIG. 8 is a plan view of a liquid crystal display panel 2 according to the second embodiment. FIG. 9 is a sectional view of the liquid crystal display panel 2 taken along line A-A' in FIG. 8.

Pixel electrodes 22-1, 22-2 and 22-3 are provided on an insulating film 21. The pixel electrodes 22-1, 22-2 and 22-3 are separated by slits ST. The pixel electrode 22-1, pixel electrode 22-3 and pixel electrode 22-2 are arranged in the Y direction in the order presented here.

The pixel electrode 22-3 is electrically connected to a connection electrode 18 by a contact 23-3.

In planar view, a reflection film 20-1 overlaps the pixel electrode 22-1. In planar view, a reflection film 20-2 overlaps the pixel electrode 22-2. No reflection film is provided below the pixel electrode 22-3.

A protrusion 27-3 is provided on a common electrode 26. In planar view, the protrusion 27-3 is placed at the center of the pixel electrode 22-3 in the Y direction.

As in the first embodiment, a thickness adjusting layer 25-1 is provided on a color filter 24 and above the reflection film 20-1. A protrusion 27-1 is provided on the common electrode 26 and above the pixel electrode 22-1. A thickness adjusting layer 25-2 is provided on the color filter 24 and above the reflection film 20-2. A protrusion 27-2 is provided on the common electrode 26 and above the pixel electrode 22-2.

Figure 10:
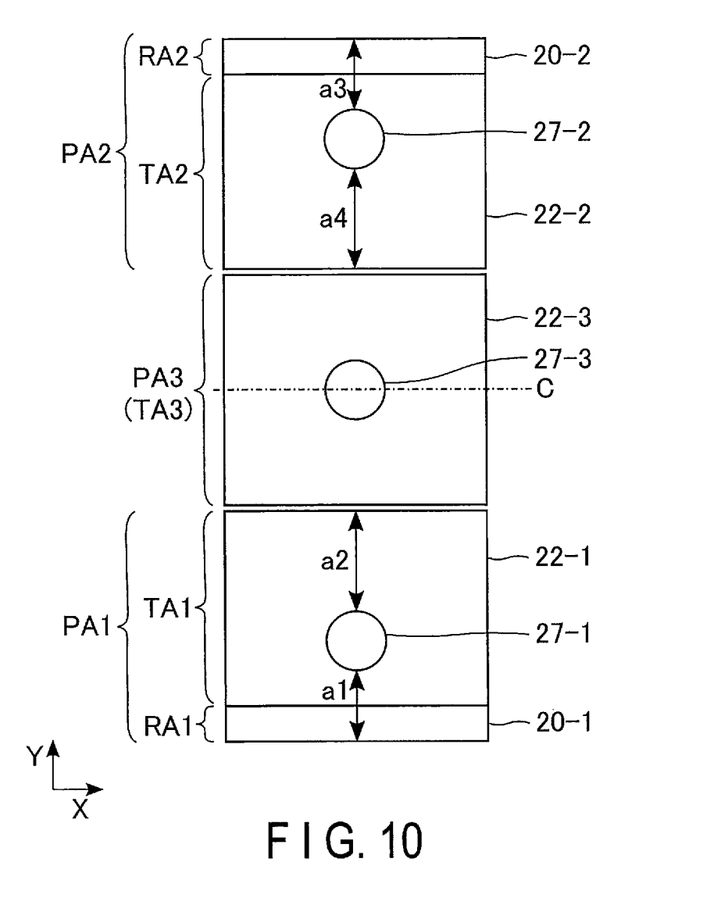
FIG. 10 is a schematic diagram of the liquid crystal display panel according to the second embodiment.

FIG. 10 is a schematic diagram of the liquid crystal display panel 2 according to the second embodiment.

In each pixel, an area where the pixel electrode 22-1 is provided is a partial pixel area PA1, an area where the pixel electrode 22-2 is provided is a partial pixel area PA2, and an area where the pixel electrode 22-3 is provided is a partial pixel area PA3. The partial pixel area PA3 as a whole is configured by a transmission area TA3. The protrusion 27-3 is placed on the centerline C of the pixel.

The conditions of distances a1 to a4 shown in FIG. 10 are the same as those in the first embodiment. The second embodiment also makes it possible to inhibit display quality from being lowered without decreasing brightness in transmission display.

The present invention is not limited to the foregoing embodiments. When the invention is reduced to practice, a variety of modifications can be made without departing from the spirit of the invention. The embodiments can be combined as appropriate, and advantageous effects can be obtained from the combination. Furthermore, the foregoing embodiments include a variety of inventions, and a variety of inventions can be extracted by selecting and combining a plurality of structural elements. For example, even though some of the structural elements are deleted from the embodiments, a configuration from which the structural elements are deleted can be extracted as an invention if the problem can be solved and an advantageous effect can be obtained.

The invention claimed is:

1. A liquid crystal display device comprising:
   first and second substrates;
   a liquid crystal layer interposed between the first and second substrates and set in vertical alignment (VA) when no electric field is applied;
   a switching element provided on the first substrate;
   a connection electrode provided on the first substrate, connected to the switching element, and extending in a first direction;
   a first reflection film provided above the switching element with an insulating film therebetween, and configured to reflect light;
   a first pixel electrode provided above the first reflection film with an insulating film therebetween, overlapping the first reflection film in planar view, and formed of a transparent electrode;
   a second pixel electrode located adjacent to the first pixel electrode in the first direction, and formed of a transparent electrode;
   first and second contacts which respectively connect the first and second pixel electrodes to the connection electrode;
   a first thickness adjusting layer provided on the second substrate and overlapping the first reflection film in planar view;
   a common electrode provided on the second substrate and the first thickness adjusting layer; and
   first and second protrusions provided on the common electrode and respectively corresponding to the first and second pixel electrodes,
   wherein a thickness of the liquid crystal layer in a reflection area where the first reflection film is disposed is smaller than a thickness of the liquid crystal layer in a transmission area where no reflection film is disposed by a thickness of the first thickness adjusting layer, and
   the first protrusion is located closer to the first thickness adjusting layer than a center of the first pixel electrode is in the first direction.

2. The liquid crystal display device according to claim 1, further comprising:
   a second reflection film located at a same level as the first reflection film to overlap the second pixel electrode in planar view, and configured to reflect light; and
   a second thickness adjusting layer provided on the second substrate to overlap the second reflection film in planar view,
   wherein the second protrusion is located closer to the second thickness adjusting layer than a center of the second pixel electrode is in the first direction.

3. The liquid crystal display device according to claim 1, wherein the first and second protrusions overlap the first and second contacts, respectively in planar view.

4. The liquid crystal display device according to claim 1, wherein when a distance between the first protrusion and the first thickness adjusting layer is L, a height of the first thickness adjusting layer is t, the thickness of the liquid crystal layer in the transmission area is d, and a ratio of the height t to the thickness d is D (=t/d), L×D is 4.9 μm or less.

5. The liquid crystal display device according to claim 1, wherein the first reflection film has an area that is 30% or less of an area of the first pixel electrode.

6. The liquid crystal display device according to claim 2, wherein when a distance between the second protrusion and the second thickness adjusting layer is L, a height of the second thickness adjusting layer is t, the thickness of the liquid crystal layer in the transmission area is d, and a ratio of the height t to the thickness d is D (=t/d), L×D is 4.9 μm or less.

7. The liquid crystal display device according to claim 2, wherein the second reflection film has an area that is 30% or less of an area of the second pixel electrode.

8. The liquid crystal display device according to claim 1, further comprising:
   a third pixel electrode located at a same level as the first pixel electrode and between the first pixel electrode and the second pixel electrode;
   a third contact which connects the third pixel electrode and the connection electrode; and
   a third protrusion provided on the common electrode to correspond to the third pixel electrode.

9. The liquid crystal display device according to claim 8, wherein the third protrusion is located at a center of the third pixel electrode in the first direction.

\* \* \* \* \*